United States Patent
Yoshimi et al.

(10) Patent No.: US 7,586,571 B2
(45) Date of Patent: Sep. 8, 2009

(54) COMPOSITE DOUBLE REFRACTION MEMBER

(75) Inventors: Hiroyuki Yoshimi, Ibaraki (JP); Yuuichi Nishikouji, Ibaraki (JP); Nao Murakami, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 608 days.

(21) Appl. No.: 10/546,874

(22) PCT Filed: Aug. 26, 2004

(86) PCT No.: PCT/JP2004/012298

§ 371 (c)(1), (2), (4) Date: Aug. 25, 2005

(87) PCT Pub. No.: WO2005/022214

PCT Pub. Date: Mar. 10, 2005

(65) Prior Publication Data
US 2006/0176427 A1    Aug. 10, 2006

(30) Foreign Application Priority Data
Sep. 1, 2003  (JP) .............................. 2003-309220

(51) Int. Cl.
*G02F 1/1335* (2006.01)
(52) U.S. Cl. ...................... 349/119; 349/117
(58) Field of Classification Search .................. None
See application file for complete search history.

(56) References Cited

U.S. PATENT DOCUMENTS

| | | | |
|---|---|---|---|
| 6,238,753 B1 | 5/2001 | Ezzell et al. | |
| 6,330,108 B1* | 12/2001 | Nishikouji et al. | 359/499 |
| 2003/0086033 A1* | 5/2003 | Sasaki et al. | 349/96 |
| 2005/0099562 A1 | 5/2005 | Nishikouji et al. | |

FOREIGN PATENT DOCUMENTS

| EP | 0 487 359 A2 | 11/1990 |
|---|---|---|
| EP | 1 160 591 A1 | 12/2001 |

(Continued)

OTHER PUBLICATIONS

Office Action of Corresponding Taiwanese Patent Application No. 93125803 issued Oct. 9, 2007.

*Primary Examiner*—David Nelms
*Assistant Examiner*—W. Patty Chen
(74) *Attorney, Agent, or Firm*—Westerman, Hattori, Daniels & Adrian, LLP.

(57) ABSTRACT

The present invention provides a composite birefringent member including a first birefringent layer and a second birefringent layer. The second birefringent layer is formed on at least one surface of the first birefringent layer. In the wavelength range from 400 to 800 nm, a value of $\Delta nd_x/\Delta nd_{550}$ and a value of $Rth_x/Rth_{550}$ of the composite birefringent member as a whole are different from each other. The composite birefringent member satisfies a requirement that the second birefringent layer is formed of a polymer such as polyamide and/or a requirement that $\Delta nd$ and $Rth$ of the composite birefringent member satisfy formulae (I) and (II) below. As a result, the composite birefringent member allows a liquid crystal display to achieve a wide viewing angle, compensates birefringence of a liquid crystal cell, and does not cause display coloring of the liquid crystal display.

$$\Delta nd_{400}/\Delta nd_{550} < 1 \quad (I)$$

$$Rth_{400}/Rth_{550} > 1 \quad (II).$$

15 Claims, 3 Drawing Sheets

FOREIGN PATENT DOCUMENTS

| | | |
|---|---|---|
| JP | 3-24502 | 2/1991 |
| JP | 3-33719 | 2/1991 |
| JP | 4-194820 | 7/1992 |
| JP | 8-511812 | 12/1996 |
| JP | 10-508048 | 8/1998 |
| JP | 2000-227520 | 8/2000 |
| JP | 2000-511296 | 8/2000 |
| JP | 2001-49110 | 2/2001 |
| JP | 2001-343529 | 12/2001 |
| JP | 2002-277635 | 9/2002 |
| WO | WO 94/24191 | 10/1994 |
| WO | WO 96/11967 | 4/1996 |
| WO | WO 97/44704 | 11/1997 |
| WO | WO 03/071319 A1 | 8/2003 |
| WO | WO 2004068226 A1 * | 8/2004 |

* cited by examiner

COMPOSITE DOUBLE REFRACTION MEMBER

TECHNICAL FIELD

The present invention relates to a composite birefringent member including a first birefringent layer and a second birefringent layer.

BACKGROUND ART

Retardation films are used in various liquid crystal displays. A liquid crystal display incorporating a retardation film can have improved display characteristics because the retardation film serves to compensate a viewing angle and the birefringence of a liquid crystal cell, for example. As the retardation film, a film exhibiting an optically positive or negative uniaxiality has been used conventionally (see Patent Documents 1 and 2, for example). However, depending on the types of liquid crystal display, such a uniaxial film may not sufficiently improve the display characteristics of the liquid crystal display even if it is incorporated therein.

In order to solve this problem, an optically biaxial film with its refractive indices in three directions being controlled has been used as a retardation film (see Patent Documents 3 and 4, for example). In general, such a biaxial film is formed by biaxially stretching a polymer film. However, there still has been a problem in that such a biaxial film may cause display coloring when incorporated in a liquid crystal display.

Patent Document 1: JP 4(1992)-194820 A
Patent Document 2: JP 8(1996)-511812 A
Patent Document 3: JP 3(1991)-33719 A
Patent Document 4: JP 3(1991)-24502 A

DISCLOSURE OF INVENTION

Problem to be Solved by the Invention

With the foregoing in mind, it is an object of the present invention to provide a composite birefringent member useful as a retardation film that allows a liquid crystal display to achieve a wide viewing angle, compensates birefringence of a liquid crystal cell, and does not cause display coloring of the liquid crystal display.

Means for Solving Problem

The present invention provides a composite birefringent member including a first birefringent layer and a second birefringent layer. The second birefringent layer is formed on at least one surface of the first birefringent layer. A value of $\Delta nd_x/\Delta nd_{550}$ and a value of $Rth_x/Rth_{550}$ of the composite birefringent member as a whole are different from each other in a wavelength range from 400 to 800 nm, and the composite birefringent member satisfies at least one of the following requirements (a) and (b).

(a) The second birefringent layer is formed of at least one non-liquid crystal polymer selected from the group consisting of polyamide, polyimide, polyester, polyetherketone, polyaryletherketone, polyamide imide and polyester-imide.

(b) $\Delta nd$ and $Rth$ of the composite birefringent member satisfy formulae (I) and (II) below.

$$\Delta nd_{400}/\Delta nd_{550} < 1 \quad \text{(I)}$$

$$Rth_{400}/Rth_{550} > 1 \quad \text{(II)}$$

In the above, $\Delta nd_x$ and $Rth_x$ respectively represent $\Delta nd$ and $Rth$ at a wavelength of x nm, $\Delta nd_{550}$ and $Rth_{550}$ respectively represent $\Delta nd$ and $Rth$ at a wavelength of 550 nm, $\Delta nd$ is $(nx-ny) \times d$, and $Rth$ is $(nx-nz) \times d$, where nx, ny and nz respectively represent refractive indices in an X-axis direction, a Y-axis direction, and a Z-axis direction in the composite birefringent member, with the X-axis direction being an axial direction exhibiting a maximum refractive index within a plane of the composite birefringent member, the Y-axis direction being an axial direction perpendicular to the X axis within the plane, and the Z-axis direction being a thickness direction perpendicular to the X axis and the Y axis, and d represents a thickness of the plane of the composite birefringent member.

Effects of the Invention

A composite birefringent member of the present invention allows a liquid crystal display to achieve a wide viewing angle, compensates birefringence of a liquid crystal cell, and does not cause display coloring of the liquid crystal display.

DESCRIPTION OF THE INVENTION

The present invention provides a composite birefringent member including two layers, namely, a first birefringent layer and a second birefringent layer. The composite birefringent member according to the present invention satisfies the above-described predetermined requirements, so that, when it is used in a liquid crystal panel or the like, it can compensate a viewing angle of a polarizing film and the birefringence of liquid crystal. Furthermore, the inventors of the present invention also discovered that the composite birefringent member of the present invention is less liable to cause display coloring of a liquid crystal panel or the like. The composite birefringent member of the present invention may satisfy either one or both of the above-mentioned requirements (a) and (b). Hereinafter, the composite birefringent member satisfying the requirement (a) only is referred to as a first composite birefringent member, the composite birefringent member satisfying the requirement (b) only is referred to as a second composite birefringent member, and the composite birefringent member satisfying both the requirements (a) and (b) is referred to as a third composite birefringent member.

The first composite birefringent member is a composite birefringent member satisfying the requirement (a) only, as described above. More specifically, the first composite birefringent member is a composite birefringent member including a first birefringent layer and a second birefringent layer, in which the second birefringent layer is formed on at least one surface of the first birefringent layer. The second birefringent layer is formed of at least one non-liquid crystal polymer selected from the group consisting of polyamide, polyimide, polyester, polyetherketone, polyaryletherketone, polyamide imide and polyesterimide, and a value of $\Delta nd_x/\Delta nd_{550}$ and a value of $Rth_x/Rth_{550}$ of the first composite birefringent member as a whole are different from each other in a wavelength range from 400 to 800 nm.

In the above, $\Delta nd_x$ and $Rth_x$ respectively represent $\Delta nd$ and $Rth$ at a wavelength of x nm, $\Delta nd_{550}$ and $Rth_{550}$ respectively represent $\Delta nd$ and $Rth$ at a wavelength of 550 nm, $\Delta nd$ is $(nx-ny) \times d$, and $Rth$ is $(nx-nz) \times d$, where nx, ny and nz respectively represent refractive indices in an X-axis direction, a Y-axis direction, and a Z-axis direction in the composite birefringent member, with the X-axis direction being an axial direction exhibiting a maximum refractive index within a plane of the composite birefringent member, the Y-axis direction being an axial direction perpendicular to the X axis within the plane, and the Z-axis direction being a thickness direction perpendicular to the X axis and the Y axis, and d represents a thickness of the plane of the composite birefringent member.

Furthermore, the second composite birefringent member is a composite birefringent member satisfying the requirement (b) only, as described above. More specifically, the second composite birefringent member is a composite birefringent member including a first birefringent layer and a second birefringent layer, in which the second birefringent layer is formed on at least one surface of the first birefringent layer. A value of $\Delta nd_x/\Delta nd_{550}$ and a value of $Rth_x/Rth_{550}$ of the second composite birefringent member as a whole are different from each other in a wavelength range from 400 to 800 nm, and $\Delta nd$ and $Rth$ of the second composite birefringent member satisfy formulae (I) and (II) below.

$$\Delta nd_{400}/\Delta nd_{550} < 1 \qquad (I)$$

$$Rth_{400}/Rth_{550} > 1 \qquad (II)$$

In the above, $\Delta nd_x$, $\Delta nd_{550}$, $Rth$, and $Rth_{550}$ are the same as described above, and $\Delta nd_{400}$ and $Rth_{400}$ respectively represent $\Delta nd$ and $Rth$ at a wavelength of 400 nm.

It is to be noted here that, in the second and third composite birefringent members of the present invention, it is preferable that the second birefringent layer is formed of at least one non-liquid crystal polymer selected from the group consisting of polyamide, polyimide, polyester, polyetherketone, polyaryletherketone, polyamide imide and polyesterimide.

In the composite birefringent member of the present invention, the second birefringent layer preferably is formed of a material that is different from a material for forming the first birefringent layer.

A laminated polarizing plate according to the present invention is a laminated polarizing plate including a composite birefringent member of the present invention.

A liquid crystal display according to the present invention is a liquid crystal display including a liquid crystal cell and an optical member. In the liquid crystal display, the optical member is disposed on at least one surface of the liquid crystal cell, and the optical member is a composite birefringent member of the present invention or a laminated polarizing plate of the present invention.

An image display according to the present invention is an image display selected from the group consisting of a liquid crystal display, a plasma display and an electroluminescence display. The image display includes a composite birefringent member of the present invention or a laminated polarizing plate of the present invention.

A composite birefringent member according to the present invention includes a first birefringent layer and a second birefringent layer. Examples of a material for forming the first birefringent layer include those exhibiting birefringence when stretched or shrunk. Preferably, the material for forming the first birefringent layer is a polymer that forms a transparent film. The material for forming the first birefringent layer is not particularly limited as long as a composite birefringent member obtained finally satisfies the above-mentioned respective requirements of the present invention. However, in order to allow the composite birefringent member obtained finally to satisfy, among the above-described requirements, the requirement that "a value of $\Delta nd_x/\Delta nd_{550}$ and a value of $Rth_x/Rth_{550}$ of the composite birefringent member as a whole are different from each other in a wavelength range from 400 to 800 nm" in particular, it is preferable to select a material that can form a first birefringent layer exhibiting $\Delta nd$ and $Rth$ with relatively small wavelength dispersions and having a property satisfying $\Delta nd \geq Rth$.

A polymer as a material for forming the first birefringent layer may be, for example, a polyolefin (polyethylene, polypropylene, polynorbornene or the like), amorphous polyolefin, polyimide, polyamide imide, polyamide, polyetherimide, polyether ether ketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, polypropylene, polynorbornene, a cellulose-based polymer (triacetylcellulose (TAC) or the like), an epoxy resin, a phenol resin, a norbornene-based resin, a polyester resin, a polyether-sulfone resin, a polysulfone resin, a polycarbonate resin, a polyamide resin, a polyimide resin, a polyolefin resin, an acrylic resin, a polynorbornene resin, a polyarylate resin, a polystyrene resin, a polyvinyl alcohol resin, a polyvinyl chloride resin, a polyvinylidene chloride resin, a polyacrylic resin, a mixture of these materials or the like.

As a material for forming the first birefringent layer, a liquid crystal polymer or the like also can be used. For example, a mixture formed of a thermoplastic resin whose side chain has a substituted or unsubstituted imido group and a thermoplastic resin whose side chain has a substituted or unsubstituted phenyl group and a nitrile group, which is described in JP 2001-343529 A(WO 01/37007), also can be used. Specific examples thereof include a mixture of an alternating copolymer of isobutene and N-methyl maleimide and an acrylonitrile-styrene copolymer.

Among these materials, polyethylene, polypropylene, polynorbornene, cellulose-based polymers, polymer carbonate resins, and the like are preferable as a material for forming the first birefringent layer, for example. Furthermore, it is preferable that a material for forming the first birefringent layer has a negative birefringence. Still further, it is preferable that the first birefringent layer has a property satisfying $\Delta nd_{400}/\Delta nd_{550} < 1$.

A polymer film used for forming the first birefringent layer can be produced by forming any of the above-mentioned polymers etc. into a film according to a method such as extrusion, a calender method or a solvent casting method. Moreover, the polymer film may be stretched (e.g., uniaxially or biaxially) so as to have optical characteristics desired for forming a composite birefringent member of the present invention.

As the polymer film, a polymer film that has been subjected to a surface treatment such as, for example, a treatment for imparting hydrophilicity, a treatment for imparting hydrophobicity, or a treatment for reducing the solubility of a base also may be used.

The thickness of the first birefringent layer generally is not less than 10 μm and not more than 500 μm, preferably not less than 20 μm and not more than 200 μm, and particularly preferably not less than 30 μm and not more than 100 μm.

Next, examples of a material for forming the second birefringent layer include polymers that form films exhibiting birefringence. The material for forming the second birefringent layer is not particularly limited as long as a composite birefringent member obtained finally satisfies the above-mentioned respective requirements of the present invention. However, in order to allow the composite birefringent member obtained finally to satisfy, among the above-described requirements, the requirement that "a value of $\Delta nd_x/\Delta nd_{550}$ and a value of $Rth_x/Rth_{550}$ of the composite birefringent member as a whole are different from each other in a wavelength range from 400 to 800 nm" in particular, it is preferable to select a material that can form a second birefringent layer exhibiting relatively large $\Delta nd$ and relatively great change in $Rth$, i.e., a second birefringent layer having a property satisfying $\Delta nd < Rth$.

In the first and third composite birefringent members, a non-liquid crystal polymer is used as a material for forming the second birefringent layer. In the second composite birefringent member, a material for forming the second birefringent layer is not particularly limited as long as a composite birefringent member obtained finally satisfies the above-mentioned formulae (I) and (II) of the present invention, but preferably is a non-liquid crystal polymer, for example.

The non-liquid crystal polymer preferably is polyamide, polyimide, polyester, polyetherketone, polyaryletherketone, polyamide imide, polyesterimide, or the like because of its excellent heat resistance, chemical resistance, transparency, and hardness. It may be possible to use one of these polymers alone or a mixture of two or more polymers having different functional groups, e.g., a mixture of polyaryletherketone and polyamide. Among these polymers, polyimide is particularly preferable because of its high transparency, high aligning property, and high stretching property.

The molecular weight of the non-liquid crystal polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane aligning property and is soluble in an organic solvent. Specifically, examples of such a polyimide include a condensation polymer product of 9,9-bis(aminoaryl)fluorene and an aromatic tetracarboxylic dianhydride disclosed in JP 2000-511296 A, i.e., a polymer containing at least one repeating unit represented by the general formula (1) below.

[Chemical Formula 1]

(1)

In the above general formula (1), $R^3$ to $R^6$ are at least one substituent selected independently from the group consisting of a hydrogen atom, a halogen atom, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of a halogen atom, a phenyl group, a phenyl group substituted with 1 to 4 halogen atoms or a $C_{1-10}$ alkyl group, and a $C_{1-10}$ alkyl group.

In the above general formula (1), Z is, for example, a $C_{6-20}$ quadrivalent aromatic group, and preferably is a pyromellitic group, a polycyclic aromatic group, a derivative of a polycyclic aromatic group, or a group represented by the general formula (2) below.

[Chemical Formula 2]

(2)

In the general formula (2) above, Z' is, for example, a covalent bond, a $C(R^7)_2$ group, a CO group, an O atom, an S atom, an $SO_2$ group, an $Si(C_2H_5)_2$ group, or an $NR^8$ group. When there are plural Z's, they may be the same or different. Also, w is an integer from 1 to 10. $R^7$s independently are a hydrogen atom or $C(R^9)_3$. $R^8$ is a hydrogen atom, an alkyl group having from 1 to about 20 carbon atoms, or a $C_{6-20}$ aryl group, and when there are plural $R^8$s, they may be the same or different. $R^9$s are a hydrogen atom, a fluorine atom, or a chlorine atom.

The above-mentioned polycyclic aromatic group may be, for example, a quadrivalent group derived from naphthalene, fluorene, benzofluorene, or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof, and halogen atoms such as an F atom and a Cl atom.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the general formula (5) below is a preferable mode of the homopolymer represented by the general formula (3).

[Chemical Formula 3]

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is a halogen atom), a CO group, an O atom, an S atom, an $SO_2$ group, an $Si(CH_2CH_3)_2$ group, and an $N(CH_3)$ group, and G and G' may be the same or different.

In the above general formulae (3) and (5), L is a substituent, and d and e indicate the number of substitutions therein. L is, for example, a halogen atom, a $C_{1-3}$ alkyl group, a halogenated $C_{1-3}$ alkyl group, a phenyl group, or a substituted phenyl group, and when there are plural Ls, they may be the same or different. The above-mentioned substituted phenyl group may be, for example, a substituted phenyl group having at least one substituent selected from the group consisting of a halogen atom, a $C_{1-3}$ alkyl group and a halogenated $C_{1-3}$ alkyl group. Also, the above-mentioned halogen atom may be, for example, a fluorine atom, a chlorine atom, a bromine atom, or an iodine atom. d is an integer from 0 to 2, and e is an integer from 0 to 3.

In the above general formulae (3) to (5), Q is a substituent, and f indicates the number of substitutions therein. Q may be, for example, an atom or a group selected from the group consisting of a hydrogen atom, a halogen atom, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen atom may be, for example, a fluorine atom, a chlorine atom, a bromine atom, or an iodine atom. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above general formula (4), $R^{10}$ and $R^{11}$ are groups selected independently from the group consisting of a hydrogen atom, a halogen atom, a phenyl group, a substituted phenyl group, an alkyl group, and a substituted alkyl group. It is particularly preferable that $R^{10}$ and $R^{11}$ independently are a halogenated alkyl group.

In the above general formula (5), $M^1$ and $M^2$ may be the same or different and, for example, a halogen atom, a $C_{1-3}$ alkyl group, a halogenated $C_{1-3}$ alkyl group, a phenyl group, or a substituted phenyl group. The above-mentioned halogen atom may be, for example, a fluorine atom, a chlorine atom, a bromine atom, or an iodine atom. The above-mentioned substituted phenyl group may be, for example, a substituted phenyl group having at least one substituent selected from the group consisting of a halogen atom, a $C_{1-3}$ alkyl group, and a halogenated $C_{1-3}$ alkyl group.

A specific example of polyimide represented by the general formula (3) includes polyimide represented by the general formula (6) below.

[Chemical Formula 4]

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride, or 2,2'-substituted biphenyl tetracarboxylic dianhydride.

The pyromellitic dianhydride may be, for example, pyromellitic dianhydride, 3,6-diphenyl-pyromellitic dianhydride, 3,6-bis(trifluoromethyl)pyromellitic dianhydride, 3,6-dibromopyromellitic dianhydride, or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride, or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride, or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride, or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride, or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2, 5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride, and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine, and other aromatic diamines.

The benzenediamine may be, for example, diamine selected from the group consisting of benzenediamines such as o-, m-, and p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine, and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether, or 4,4'-diaminodiphenylsulfone.

The polyetherketone may be, for example, polyaryletherketone represented by the general formula (7) below, which is disclosed in JP 2001-49110 A

[Chemical Formula 5]

(7)

In the above general formula (7), X is a substituent, and q is the number of substitutions therein. X is, for example, a halogen atom, a lower alkyl group, a halogenated alkyl group, a lower alkoxy group, or a halogenated alkoxy group, and when there are plural Xs, they may be the same or different.

The halogen atom may be, for example, a fluorine atom, a bromine atom, a chlorine atom, or an iodine atom, and among these, a fluorine atom is preferable. The lower alkyl group preferably is a $C_{1-6}$ lower straight chain alkyl group or a $C_{1-6}$ lower branched chain alkyl group and more preferably is a $C_{1-4}$ straight or branched chain alkyl group, for example. More specifically, it preferably is a methyl group, an ethyl group, a propyl group, an isopropyl group, a-butyl group, an isobutyl group, a sec-butyl group, or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group, or a tert-butoxy group, and particularly preferably is a methoxy group or an ethoxy group. The halogenated alkoxy group may be, for example, a halide of the above-mentioned lower alkoxy group such as a trifluoromethoxy group.

In the above general formula (7), q is an integer from 0 to 4. In the general formula (7), it is preferable that q=0 and a carbonyl group and an oxygen atom of an ether that are bonded to both ends of a benzene ring are present at para positions.

Also, in the above general formula (7), $R^1$ is a group represented by the general formula (8) below, and m is an integer of 0 or 1.

[Chemical Formula 6]

(8)

In the above general formula (8), X' is a substituent and is the same as X in the general formula (7), for example. In the general formula (8), when there are plural X's, they may be the same or different. q' indicates the number of substitutions in the X' and is an integer from 0 to 4, preferably, q'=0. In addition, p is an integer of 0 or 1.

In the general formula (8), $R^2$ is a divalent aromatic group. This divalent aromatic group is, for example, an o-, m-, or p-phenylene group or a divalent group derived from naphthalene, biphenyl, anthracene, o-, m-, or p-terphenyl, phenanthrene, dibenzofuran, biphenyl ether, or biphenyl sulfone. In these divalent aromatic groups, a hydrogen atom that is bonded directly to the aromatic may be substituted with a halogen atom, a lower alkyl group, or a lower alkoxy group. Among them, the $R^2$ preferably is an aromatic group selected from the group consisting of the general formulae (9) to (15) below.

[Chemical Formula 7]

[Chemical Formula 8]

Furthermore, in the general formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the general formula (7) is a fluorine atom and an end on an oxyalkylene group side thereof is a hydrogen atom. Such a polyaryletherketone can be represented by the general formula (17) below, for example. In the general formula below, n indicates a degree of polymerization as in the general formula (7).

[Chemical Formula 9]

In the above general formula (7), the $R^1$ preferably is a group represented by the general formula (16) below, wherein $R^2$ and p are equivalent to those in the above-noted general formula (8).

Specific examples of the polyaryletherketone represented by the general formula (7) may include those represented by the general formulae (18) to (21) below, wherein n indicates a degree of polymerization as in the general formula (7).

[Chemical Formula 10]

-continued

Other than the above, the polyamide or polyester may be, for example, polyamide or polyester described by JP 10(1998)-508048 A, and their repeating units can be represented by the general formula (22) below.

[Chemical Formula 11]

In the above general formula (22), Y is an O atom or an NH group. E is, for example, at least one group selected from the group consisting of a covalent bond, a $C_2$ alkylene group, a halogenated $C_2$ alkylene group, a $CH_2$ group, a $C(CX_3)_2$ group (wherein X is a halogen atom or a hydrogen atom), a CO group, an O atom, an S atom, an $SO_2$ group, an $Si(R)_2$ group, and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above general formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, a hydrogen atom, a halogen atom, a $C_{1-3}$ alkyl group, a halogenated $C_{1-3}$ alkyl group, an alkoxy group represented by OR (wherein R is the group defined above), an aryl group, a substituted aryl group by halogenation or the like, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, a halogen atom, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, a halogen atom, a $C_{1-3}$ alkyl group, a halogenated $C_{1-3}$ alkyl group, or a combination thereof. The t is an integer from 0 to 4, and the z is an integer from 0 to 3.

Among the repeating units of the polyamide or polyester represented by the general formula (22) above, the repeating unit represented by the general formula (23) below is preferable.

[Chemical Formula 12]

In the general formula (23), A, A', and Y are those defined by the general formula (22), and v is an integer from 0 to 3, preferably is an integer from 0 to 2. Although each of x and y is 0 or 1, not both of them are 0.

As the non-liquid crystal polymer, those represented by the general formulae (3) to (5), which are disclosed in JP 8(1996)-511812 A, are preferable.

The thickness of the second birefringent layer generally is not less than 1 μm and not more than 20 μm, preferably not less than 1 μm and not more than 10 μm, and particularly preferably not less than 1 μm and not more than 7 μm.

The composite birefringent member of the present invention can be produced in the following manner, for example.

First, a first birefringent layer is formed by stretching or shrinking a polymer film as a material for forming the first birefringent layer.

The method of stretching the polymer film is not particularly limited, and any ordinary methods can be applied. Examples of the stretching method include uniaxial stretching, tenter transverse stretching, and biaxial stretching. The uniaxial stretching preferably is free-end uniaxial stretching or fixed-end uniaxial stretching. In the biaxial stretching, it is preferable that the stretch ratio in the long axis direction is lower than that in the short axis direction. The biaxial stretching can be selected from simultaneous biaxial stretching that uses a tenter alone, and sequential biaxial stretching that uses rollers and a tenter.

Though the stretch ratio of the polymer film varies depending on the stretching method, it is in general from 102% to 200% with respect to the length of the polymer film.

The temperature for stretching the polymer film is selected suitably depending on the glass transition point (Tg) of the polymer film in use, the kinds of additives in the polymer film, and the like. The temperature for stretching the polymer film is, for example, 50° C. to 300° C., preferably 50° C. to 200° C., and particularly preferably 80° C. to 170° C. In particular, it is preferable that the temperature for stretching the polymer film is substantially equal to or higher than Tg of the polymer film to be stretched.

The method of shrinking the polymer film is not particularly limited, and ordinary methods can be applied. Examples of the shrinking method include a method in which a polymer film is formed on a base, and the base on which the polymer film has been formed is heated or cooled, thereby causing the shrinkage of the base. As the base, a shrinkable base such as a heat shrinkable film or the like can be used. When using a shrinkable base, it is preferable to control the shrinkage of the base using a stretching machine. Specifically, this can be carried out, for example, by setting a tenter stretching machine so that the stretch ratio of the film would be less than 1 or by setting a longitudinal uniaxial stretching machine so that the stretch ratio of the film would be 1 to cause shrinkage in the width direction.

As described above, the first birefringent layer can be formed by carrying out the stretching or shrinking treatment.

Next, a predetermined polymer for forming a second birefringent layer as described above is coated on at least one surface of the first birefringent layer to form a precursor layer of a second birefringent layer. The method of coating the polymer is not particularly limited, but may be a method in which the polymer that has been heated and melted is applied or a method in which a polymer solution prepared by dissolving the polymer in a solvent is applied, for example. Among these methods, the method in which a polymer solution is applied is preferable because of its excellent workability and its optical anisotropy controllability.

There is no particular limit to the concentration of the polymer in the polymer solution. For example, in order to obtain the viscosity facilitating coating, with respect to 100 parts by weight of a solvent, the content of the polymer is, for example, 0.5 to 50 parts by weight, preferably 5 to 50 parts by weight, and more preferably 10 to 40 parts by weight. With respect to 100 parts by weight of a solvent, the content of the polymer preferably is not less than 0.5 parts by weight because this can provide the viscosity appropriate for coating. Furthermore, the content of the polymer preferably is not more than 50 parts by weight because this can provide the viscosity that allows a smooth coated surface to be formed.

The solvent for the polymer solution is not particularly limited as long as it can dissolve the material such as the non-liquid crystal polymer or the like, and can be determined suitably according to a type of the material. Specific examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketones such as acetone, methyl ethyl ketone, methyl isobutyl ketone, cyclohexanone, cyclopentanone, 2-pyrrolidone and N-methyl-2-pyrrolidone; esters such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amides such as dimethylformamide and dimethylacetamide; nitriles such as acetonitrile and butyronitrile; ethers such as diethyl ether, dibutyl ether and tetrahydrofuran; or carbon disulfide, ethyl cellosolve or butyl cellosolve. These solvents may be used alone or in combination of two or more. Preferably, the solvent is of a type that does not corrode the first birefringent layer.

In the polymer solution, for example, various additives such as a stabilizer, a plasticizer, metal and the like further may be blended as necessary.

Moreover, the polymer solution may contain other resins as long as the alignment property or the like of the material does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic resins, novolac resins or the like.

When the above-described other resins or the like are blended in the polymer solution as mentioned above, the blend amount ranges, for example, from 0 wt % to 50 wt %, preferably from 0 wt % to 30 wt %, with respect to the polymer.

The coating of the polymer solution can be carried out by a suitable method such as spin coating, roller coating, flow coating, die coating, blade coating, printing, dip coating, film flow-expanding, bar coating, gravure printing, extrusion or the like. In the coating, polymer layers can be superimposed as required.

A method of coating the material melt is not limited as long as it enables coating on the surface of the base. Examples of the method include a casting method and a melting extrusion method. The material melt further may contain, for example, various additives such as the above-mentioned stabilizer, plasticizer, metal and the like and other resins as required.

Next, the coated layer of the solution or melt of the material on the base is hardened, thus forming a second birefringent layer on at least one surface of the first birefringent layer.

The hardening method is not particularly limited as long as it hardens the material so as to form a layer. Examples of the method include air-drying and drying by heating. The conditions under which the hardening is carried out also can be determined suitably according to, for example, the type of the material, and in the case of using a solution, the type of the solvent. For example, a temperature at which the hardening is carried out is generally from 50° C. to 500° C., preferably from 60° C. to 300° C., and more preferably from 40° C. to 200° C. The hardening may be carried out at a constant temperature or a temperature raised or lowered in a step-wise manner. A hardening time also is not limited. In the case of using a polymer solution, it is necessary to employ a condition that allows a solvent to be removed by hardening. The hardening time is, generally 5 seconds to 10 minutes, and preferably 10 seconds to 5 minutes.

By forming the second birefringent layer on the first birefringent layer in the above-described manner, a composite birefringent member according to the present invention can be formed.

Preferably, the absolute value of $Rth_x$ of the composite birefringent member of the present invention at a wavelength of x nm, for example, is the same as that of Rth of a liquid crystal cell at the wavelength of x nm, with their signs being opposite to each other. This is because the composite birefringent member satisfying such a requirement can compensate the birefringence Rth of the liquid crystal cell.

Preferably, the composite birefringent member is formed by forming the second birefringent layer using a material that is different from a material used for forming the first birefringent layer.

Furthermore, by selecting materials that can form a second birefringent layer and a first birefringent layer with optical characteristics satisfying all the following formulae (A) to (C), and then arranging the obtained second birefringent layer and first birefringent layer so that their slow axes are orthogonal to each other, it is possible to form a composite birefringent member satisfying the above-mentioned formulae (I) and (II) at the same time, i.e., a second composite birefringent member.

(A) Δnd and Rth of the first birefringent layer exhibit small wavelength dispersions.
(B) Δnd and Rth of the second birefringent layer exhibit wavelength dispersions that are smaller than those of the Δnd and Rth of the first birefringent layer.
(C) Δnd of the first birefringent layer >Δnd of the second birefringent layer, and Rth of the first birefringent layer <Rth of the second birefringent layer. Note here that Δnd and Rth are the same as described above.

The composite birefringent member according to the present invention may be used alone or, if required, in combination with an additional birefringence film or the like to form a laminate for various optical uses, e.g., optical compensating members of various liquid crystal display elements. For example, the composite birefringent member of the present invention may be used in combination with an iodine-based or dyestuff-based polarizing plate (or polarizer) produced industrially, so as to provide a laminated polarizing plate having a function of compensating and adjusting the birefringence of a liquid crystal display element.

The polarizing plate that may optionally be used in combination with the composite birefringent member according to the present invention is not particularly limited. However, the polarizing plate basically is configured by laminating a protective layer (film) on at least one surface of a polarizer.

The polarizer (polarizing film) is not particularly limited but can be a film prepared by a conventionally known method of, for example, dyeing by allowing a film of various types to adsorb a dichroic material such as iodine or a dichroic dye, followed by crosslinking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on an ethylene-vinyl acetate copolymer and cellulose-based films. Other than the above, polyene alignment films such as dehydrated PVA and dehydrochlorinated polyvinyl chloride can be used, for example. Among them, the PVA-based film is preferable. Further, generally, the polarizing film has a thickness in a range of 1 to 80 μm with no limitation thereto.

The protective layer is not particularly limited but can be a conventionally known transparent film. For example, transparent protective films having excellent transparency, mechanical strength, thermal stability, a moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Furthermore, examples of the protective layer include the polymer film described in JP 2001-343529 A(WO 01/37007). The polymer material used can be a resin composition containing a thermoplastic resin whose side chain has a substituted or unsubtituted imido group and a thermoplastic resin whose side chain has a substituted or unsubtituted phenyl group and nitrile group, e.g., a resin composition containing an alternating copolymer of isobutene and N-methyl maleimide and an acrylonitrile-styrene copolymer. Alternatively, the polymer film may be formed by extruding the resin composition.

It is preferable that the protective layer is colorless, for example. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are the same as those described above, and d represents a thickness of the protective film.

$$Rth=[\{(nx+ny)/2\}-nz]\cdot d$$

The transparent protective layer further may have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various stretched films obtained by stretching the above-described transparent resins uniaxially or biaxially, an alignment film of a liquid crystal polymer or the like, and a laminate obtained by providing an alignment layer of a liquid crystal polymer or the like on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-alignment layer of a discotic or nematic liquid crystal polymer. This optically compensating retardation plate can be a commercially available product "WV film (trade name)" manufactured by Fuji Photo Film Co., Ltd, for example. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited and can be determined suitably according to retardation or a protective strength, for example. In general, the thickness of the transparent protective layer is not more than 500 µm, preferably in the range from 5 µm to 300 µm, and more preferably in the range from 5 µm to 150 µm.

The transparent protective layer can be formed suitably by a conventionally known method such as a method of applying the above-mentioned various transparent resins to a polarizing film or a method of laminating the transparent resin film, the optically compensating retardation plate, or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness on a surface of the transparent protective layer. The curable resin can be, for example, ultraviolet-curing resins of silicone base, urethane base, acrylic, and epoxy base. The treatment can be carried out by a conventionally known method. The anti-sticking treatment aims to prevent adjacent layers from sticking to each other. The anti-reflection treatment aims to prevent reflection of external light on the surface of the polarizing plate, and can be carried out by forming a conventionally known antireflection layer or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide, or the like. Other than the above, inorganic fine particles having an electrical conductivity, organic fine particles including, for example, crosslinked or uncrosslinked polymer particles, or the like can be used as well. The average particle diameter of the transparent fine particles ranges, for example, from 0.5 to 20 µm, though there is no particular limitation. In general, a blend ratio of the transparent fine particles preferably ranges from 2 to 70 parts by weight, more preferably from 5 to 50 parts by weight with respect to 100 parts by weight of the above-described transparent resin, though there is no particular limitation.

An anti-glare layer in which the transparent fine particles are blended can be used as the transparent protective layer itself or provided as a coating layer or the like on the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer, the anti-glare layer, and the like as mentioned above can be laminated on the polarizing plate, as a sheet of optical layers including these layers, separately from the transparent protective layer.

There is no particular limitation on the method of laminating the constituent members (the composite birefringent member, the polarizer, the transparent protective layer and the like), and conventionally known methods can be employed. In general, a pressure-sensitive adhesive, an adhesive or the like that is the same as described above can be used, and the kind thereof can be determined suitably according to a material or the like of each of the constituent members. The adhesive can be, for example, a polymer adhesive based on acrylic substances, vinyl alcohol, silicone, polyester, polyurethane or polyether, or a rubber-based adhesive. It also is possible to use an adhesive containing a water-soluble crosslinking agent of vinyl alcohol-based polymers, such as boric acid, borax, glutaraldehyde, melamine and oxalic acid. The pressure-sensitive adhesive and the adhesive mentioned above do not peel off easily even when being exposed to moisture or heat, for example, and have excellent light transmittance and polarization degree. More specifically, PVA-based adhesives are preferable when the polarizer is a PVA-based film, in light of stability of adhering treatment, for example. These adhesive and pressure sensitive adhesive may be applied directly to surfaces of the polarizer and the transparent protective layer, or a layer of a tape or a sheet formed of the adhesive or pressure sensitive adhesive may be arranged on the surfaces thereof. Further, when these adhesive and pressure sensitive adhesive are prepared as an aqueous solution, for example, other additives or a catalyst such as an acid catalyst may be blended as necessary. In the case of applying the adhesive, for example, other additives or a catalyst such as an acid catalyst further may be blended in the aqueous solution of the adhesive. The thickness of the adhesive layer is not particularly limited but may be, for example, 1 nm to 500 nm, preferably 10 nm to 300 nm, and more preferably 20 nm to 100 nm. It is possible to adopt a conventionally known method of using an adhesive etc. such as an acrylic polymer or a vinyl alcohol-based polymer without any particular limitations. These adhesives can be used, for example, by coating its aqueous solution on the surface of each constituent member mentioned above, followed by drying. In the above aqueous solution, other additives or a catalyst such as an acid catalyst may be blended as necessary. Among these, the adhesive preferably is a PVA-based adhesive because an excellent adhesiveness to a PVA film can be achieved.

When forming a laminated polarizing plate by laminating a polarizing plate and a composite birefringent member, they may be laminated using any suitable adhesion means such as an adhesive layer or a pressure-sensitive adhesive layer. However, the lamination method is not limited thereto. For example, first, a composite birefringent member is produced by forming a second birefringent layer on a first birefringent layer. Then, a protective film formed of triacetylcellulose or the like is bonded to one surface of a polarizer, and the composite birefringent member is bonded to the other surface of the polarizer. If the composite birefringent member is arranged so that the first birefringent layer of the composite birefringent member faces the polarizer, the first birefringent layer of the composite birefringent member can be used as a protective film for protecting one surface of the polarizing plate.

The laminated polarizing plate according to the present invention can include in use an additional optical layer together with the composite birefringent member of the present invention. Examples of the optical layer include various optical layers that have been conventionally known and used for forming liquid crystal displays or the like, such as a polarizing plate, a reflection plate, a semitransparent reflection plate, and a brightness-enhancement film as mentioned below. These optical layers can be used alone or in combination of at least two types of layers. Such an optical layer can be provided as a single layer, or at least two optical layers can be laminated. A laminated polarizing plate further including such an optical layer is used preferably as, for example, an integrated polarizing plate having an optically compensating function, and it can be arranged on a surface of a liquid crystal cell, for example, so as to be used suitably for various image displays.

Such an integrated polarizing plate will be described below.

First, an example of a reflective polarizing plate or a semitransparent reflective polarizing plate will be described. The reflective polarizing plate is prepared by laminating further a reflection plate on a laminated polarizing plate according to the present invention, and the semitransparent reflective polarizing plate is prepared by laminating a semitransparent reflection plate on a laminated polarizing plate according to the present invention.

In general, the reflective polarizing plate is arranged on a backside of a liquid crystal cell in order to make a liquid crystal display (reflective liquid crystal display) that reflects incident light from a visible side (display side). The reflective polarizing plate is advantageous in that, for example, it allows the liquid crystal display to be thinned further because the necessity of providing a light source such as a backlight can be eliminated.

The reflective polarizing plate can be formed in any known manner such as forming a reflection plate of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil formed of a reflective metal such as aluminum.

Another example is a reflective polarizing plate prepared by forming, on a transparent protective layer having a surface with microscopic asperities due to microparticles contained in various transparent resins, a reflection plate corresponding to the microscopic asperities. The reflection plate having a surface with microscopic asperities diffuses incident light irregularly so that directivity and glare can be prevented and irregularity in color tones can be controlled. The reflection plate can be formed by attaching the metal foil or the metal deposited film directly on the surface with asperities of the transparent protective layer by any conventionally known methods including deposition and plating, such as vacuum deposition, ion plating, and sputtering.

As mentioned above, the reflection plate can be formed directly on a transparent protective layer of a polarizing plate. Alternatively, a reflecting sheet or the like formed by providing a reflecting layer on a proper film such as the transparent protective film can be used as the reflection plate. Since a typical reflecting layer of a reflection plate is made of a metal, it is preferably used in a state that the reflecting surface of the reflecting layer is coated with the film, a polarizing plate, or the like, in order to prevent a reduction of the reflectance due to oxidation, and furthermore, to allow the initial reflectance to be maintained for a long period and to avoid the necessity of forming a transparent protective layer separately.

On the other hand, the semitransparent polarizing plate is provided by replacing the reflection plate in the above-mentioned reflective polarizing plate by a semitransparent reflection plate. Examples of a semitransparent polarizing plate include a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of a polarizing plate prepared by further laminating a brightness-enhancement film on the laminated polarizing plate according to the present invention.

A suitable example of the brightness-enhancement film is not particularly limited, but it can be selected from a multi-layer thin film of a dielectric or a laminate of multiple thin films with varied refraction aeolotropy that transmits linearly polarized light having a predetermined polarization axis while reflecting other light. Examples of such a brightness-enhancement film include "D-BEF (trade name)" manufactured by 3M Co. Also, a cholesteric liquid crystal layer, more specifically, an alignment film of a cholesteric liquid crystal polymer or an alignment liquid crystal layer fixed onto a supportive film base can be used as a brightness-enhancement film. Such a brightness-enhancement film reflects either clockwise or counterclockwise circularly polarized light while it transmits other light. Examples of such a brightness-enhancement film include "PCF 350 (trade name)" manufactured by Nitto Denko Corporation, "Transmax (trade name)" manufactured by Merck and Co., Inc., and the like.

An example of the various polarizing plates of the present invention can be an optical member including two or more optical layers, which is formed by laminating an additional optical layer and the above-mentioned laminated polarizing plate including a birefringent layer.

An optical member including a laminate of at least two the above-mentioned optical layers can be formed, for example, by a method of laminating layers separately in a certain order in the process for manufacturing a liquid crystal display or the like. However, efficiency in manufacturing a liquid crystal display or the like can be improved by using an optical member that has been laminated previously because of its excellent stability in quality, assembling operability, and the like. Any appropriate adhesion means such as a pressure-sensitive adhesive layer can be used for lamination as in the above.

Moreover, it is preferable that the various polarizing plates described above further have a pressure-sensitive adhesive layer or an adhesive layer so as to allow easier lamination onto the other members such as a liquid crystal cell. These adhesive layers can be arranged on one surface or both surfaces of the polarizing plate. The material for the pressure-sensitive adhesive layer is not particularly limited but can be a conventionally known material such as acrylic polymers. In particular, a pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficients, a capability of forming a liquid crystal display with high quality and excellent durability, and the like. It also may be possible to incorporate fine particles so as to form the pressure-sensitive adhesive layer showing light diffusion property. For the purpose of forming the pressure-sensitive adhesive layer on the surface of the polarizing plate, a solution or melt of a sticking material can be applied directly on a predetermined surface of the polarizing plate by a development method such as flow-expansion and coating. Alternatively, a pressure-sensitive adhesive layer can be formed on a separator, which will be described below, in the same manner and transferred to a predetermined surface of the polarizing plate. Such a layer can be formed on any surface of the polarizing plate. For example, it can be formed on an exposed surface of the retardation plate of the polarizing plate.

When a surface of a layer of a pressure-sensitive adhesive provided on the polarizing plate is exposed, preferably, the pressure-sensitive adhesive layer is covered with a separator until the time the pressure-sensitive adhesive layer is used so that contamination will be prevented. The separator can be formed by coating, on a proper film such as the transparent protective film, a peeling layer including a peeling agent containing silicone, long-chain alkyl, fluorine, molybdenum sulfide or the like as required.

The pressure-sensitive adhesive layer can be a monolayer or a laminate. The laminate can include monolayers different from each other in the type or in the compositions. When arranged on both surfaces of the polarizing plate, the pressure-sensitive adhesive layers can be same or can be different from each other in the type or in the compositions.

The thickness of the pressure-sensitive adhesive layer can be determined appropriately depending on the constituents or the like of the polarizing plate. In general, the thickness of the pressure-sensitive adhesive layer is 1 μm to 500 μm.

It is preferable that the pressure-sensitive adhesive layer is made of a pressure-sensitive adhesive having excellent optical transparency and appropriate sticking characteristics such as wettability, cohesiveness, and adhesiveness. The pressure-sensitive adhesive can be prepared appropriately based on polymers such as an acrylic polymer, a silicone-based polymer, polyester, polyurethane, polyether, and synthetic rubber.

Sticking characteristics of the pressure-sensitive adhesive layer can be controlled appropriately by a conventionally known method. For example, the degree of cross-linkage and the molecular weight will be adjusted on the basis of a composition or molecular weight of the base polymer of the pressure-sensitive adhesive layer, crosslinking type, a content of the crosslinking functional group, an amount of the blended crosslinking agent and the like.

The composite birefringent member and polarizing plate according to the present invention and other layers for composing various optical members (various polarizing plates including an additional optical layer(s)), such as the polarizing film, the transparent protective film, the optical layer, and the pressure-sensitive adhesive layer may be treated with an UV absorber such as salicylate ester compounds, benzophenone compounds, benzotriazole compounds, cyanoacrylate compounds, or nickel complex salt-based compounds, thus providing an UV absorbing capability.

As mentioned above, the composite birefringent member and the polarizing plate according to the present invention can be used preferably for forming various devices such as liquid crystal displays. For example, the polarizing plate may be arranged on at least one surface of a liquid crystal cell in order to form a liquid crystal panel used in a liquid crystal display of, e.g., a reflection type, a semitransparent type, or a transmission-reflection type.

A liquid crystal cell to compose the liquid crystal display can be selected from appropriate cells such as an active matrix driving type represented by a thin film transistor, a simple matrix driving type represented by a twist nematic type and a super twist nematic type. Since the composite birefringent member and the laminated polarizing plate according to the present invention are excellent particularly in optical compensation of a VA (Vertical Aligned) cell, they are used particularly preferably for viewing-angle compensating films for VA mode liquid crystal displays.

In general, a typical liquid crystal cell is composed of opposing liquid crystal cell substrates and liquid crystal injected into a space between the substrates. The liquid crystal cell substrates can be made of glass, plastics or the like without any particular limitations. Materials for the plastic substrates can be selected from conventionally known materials without any particular limitations.

When polarizing plates or optical members are arranged on both surfaces of a liquid crystal cell, the polarizing plates or the optical members on the surfaces can be the same type or different types. Moreover, for forming a liquid crystal display, one or more layers of appropriate components such as, for example, a prism array sheet, a lens array sheet, an optical diffuser and a backlight can be arranged at proper positions.

The liquid crystal display according to the present invention is not particularly limited as long as it includes a liquid crystal cell and an optical member and uses a composite birefringent member or laminated polarizing plate according to the present invention as the optical member. When it includes further a light source, preferably, the light source is a flat light source emitting polarized light for enabling effective use of light energy, though there is no particular limitation.

In the liquid crystal display according to the present invention, a diffusion plate, an anti-glare layer, an antireflection film, a protective layer, or a protective plate may be arranged on an composite birefringent member on the visible side. Alternatively, a compensating retardation plate or the like can be arranged suitably between the liquid crystal cell and the polarizing plate in the liquid crystal panel.

The composite birefringent member and the laminated polarizing plate according to the present invention can be used not only in the above-described liquid crystal display but also in, for example, self-light-emitting displays such as an organic electroluminescence (EL) display, a plasma display (PD) and a field emission display (FED). When used in a self-light-emitting flat display, the composite birefringent member according to the present invention is set so as to have an in-plane retardation value $\Delta$nd of $\lambda/4$, for example, and thus circularly polarized light can be obtained. This allows the composite birefringent member to be used as an antireflection filter.

The following is a specific description of an electroluminescence (EL) display including a laminated polarizing plate according to the present invention. The EL display of the present invention is a display having a composite birefringent member or a laminated polarizing plate according to the present invention, and can be either an organic EL display or an inorganic EL display.

In recent EL displays, for preventing reflection from an electrode in a black state, use of an optical film such as a polarizer and a polarizing plate as well as a λ/4 plate is proposed. The composite birefringent member and the laminated polarizing plate according to the present invention are especially useful when linearly polarized light, circularly polarized light, or elliptically polarized light is emitted from an EL layer. They are also especially useful when an oblique light beam is partially polarized even in the case where natural light is emitted in a front direction.

First, a typical organic EL display will be explained below. In general, such an organic EL display has a ruminant (organic EL luminant) that is prepared by laminating a transparent electrode, an organic ruminant layer, and a metal electrode in this order on a transparent substrate. Here, the organic luminant layer is a laminate of various organic thin films. Examples thereof include various combinations such as a laminate of a hole injection layer made of a triphenylamine derivative or the like and a luminant layer made of a phosphorous organic solid such as anthracene; a laminate of the luminant layer and an electron injection layer made of a perylene derivative or the like; and a laminate of the hole injection layer, the luminant layer, and the electron injection layer.

In general, the organic EL display emits light on the following principle: a voltage is applied to the anode and the cathode so as to inject holes and electrons into the organic luminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic ruminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li can be used.

In an organic EL display configured as described above, it is preferable that the organic ruminant layer is made of a film that is extremely thin such as about 10 nm, so that the organic luminant layer can transmit substantially whole light as the transparent electrode does. As a result, when the layer does not illuminate, a light beam entering from the surface of the transparent substrate passes through the transparent electrode and the organic luminant layer and is reflected at the metal electrode so that it comes out again to the surface of the transparent substrate. Thereby, the display surface of the organic EL display looks like a mirror when viewed from exterior.

In an organic EL display according to the present invention including an organic EL luminant having a transparent electrode on the surface side of an organic ruminant layer and a metal electrode on the back surface of the organic luminant layer, for example, it is preferable that a composite birefringent member (a laminated polarizing plate or the like) according to the present invention is arranged on the surface of the transparent electrode, and furthermore, a λ/4 plate is arranged between the polarizing plate and an EL element. As described above, an organic EL display obtained by arranging a composite birefringent member according to the present invention can suppress external reflection and improve the visibility. It is further preferable that a retardation plate is arranged between the transparent electrode and composite birefringent member.

The retardation plate and the polarizing plate or the like polarize, for example, light that enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode, and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

Hereinafter, the present invention will be described more specifically by way of examples and comparative examples. However, the present invention is not limited to the following examples. The characteristics of a first birefringent layer, a second birefringent layer and a composite birefringent member were evaluated in the following manner.

The retardation was measured using a retardation meter (manufactured by Oji Scientific Instruments, trade name: KOBRA 21ADH).

The refractive index was measured at 590 nm using a retardation meter (manufactured by Oji Scientific Instruments, trade name: KOBRA 21ADH).

The film thickness was measured using a digital micrometer K-351C (trade name) manufactured by Anritsu Corporation.

Example 1

A 100 μm thick isotropic norbornene film was stretched 180% at 175° C. by tenter transverse uniaxial stretching, thus obtaining a stretched norbornene film (a first birefringent layer) having a thickness of 60 μm. This film has Δnd of 120 nm and Rth of 155.

Polyimide having a weight-average molecular weight (Mw) of 120,000 was first synthesized from 2,2'-bis(3,4-dicarboxyphenyl) hexafluoropropane (6FDA) and 2,2'-bis (trifluoromethyl)-4,4'-diaminobiphenyl (PFMBTFMB) and then dissolved in cyclohexanone to prepare a 15 wt % solution of this polyimide. The thus-obtained polyimide solution was applied onto the stretched norbornene film. Thereafter, the film having a layer of the polyimide solution was heat-treated at 100° C. for 10 minutes, thus forming a completely transparent and smooth polyimide film having a thickness of 5 μm on the stretched norbornene film. The laminate of the stretched norbornene film and the polyimide film was then stretched 3% at 175° C. by longitudinal uniaxial stretching, thus obtaining a composite birefringent member. This composite birefringent member had $\Delta$nd of 50 nm and Rth of 250 nm and exhibited optical characteristics satisfying nx>ny>nz. The polyimide film (a second birefringent layer) had $\Delta$nd of 70 and Rth of 95.

Figure 1:
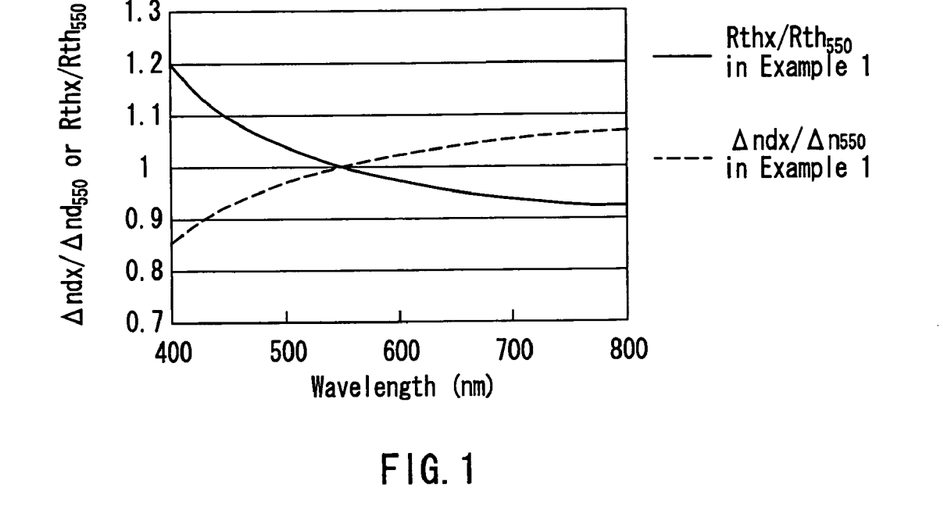
FIG. 1 is a graph showing a value of $\Delta nd_x/\Delta nd_{550}$ and a value of $Rth_x/Rth_{550}$ of a composite birefringent member obtained in Example 1 in the wavelength range from 400 to 800 nm.

FIG. 1 shows values of $\Delta nd_x/\Delta nd_{550}$ and $Rth_x/Rth_{550}$ of this composite birefringent member in the wavelength range from 400 to 800 nm.

Comparative Example 1

A 100 μm thick isotropic norbornene film was stretched 180% at 175° C. by tenter transverse uniaxial stretching, thus obtaining a film having a thickness of 60 μm. This film has $\Delta$nd of 120 nm and Rth of 155.

Figure 2:
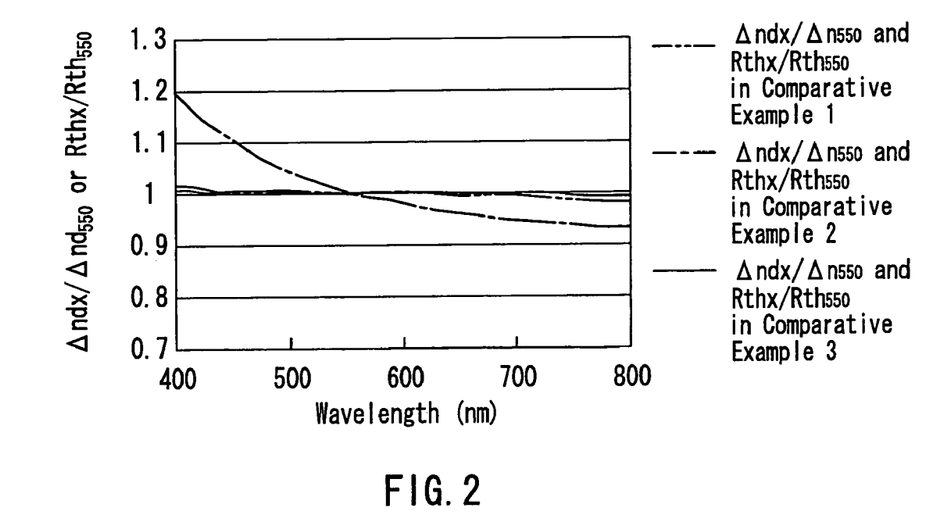
FIG. 2 is a graph showing a value of $\Delta nd_x/\Delta nd_{550}$ and a value of $Rth_x/Rth_{550}$ of each of the films obtained in Comparative Examples 1 to 3 in the wavelength range from 400 to 800 nm.

FIG. 2 shows values of $\Delta nd_x/\Delta nd_{550}$ and $Rth_x/Rth_{550}$ of this film in the wavelength range from 400 to 800 nm.

Comparative Example 2

The same polyimide solution as in Example 1 was applied onto a 50 μm thick triacetylcellulose (TAC) film (a transparent polymer film). Thereafter, the film having a layer of the polyimide solution was heat-treated at 100° C. for 10 minutes, thus forming a completely transparent and smooth polyimide film having a thickness of 6 μm on the TAC film. The polyimide film had $\Delta$n of 0.04 nm and Rth of 240 nm.

The laminate of the polyimide film and the TAC film was stretched 5% at 160° C. by longitudinal uniaxial stretching, thus obtaining a laminated film. The thus-obtained laminated film had $\Delta$n of 50 nm and Rth of 250 nm and exhibited optical characteristics satisfying nx>ny>nz. In the laminated film, the stretched polyimide film had $\Delta$nd of 50 and Rth of 210 and the stretched TAC film had $\Delta$nd of 0 and Rth of 40.

FIG. 2 shows values of $\Delta nd_x/\Delta nd_{550}$ and $Rth_x/Rth_{550}$ of this laminated film in the wavelength range from 400 to 800 nm.

Comparative Example 3

A 188 μm thick ARTON film (manufactured by JSR Corporation) was stretched 130% by longitudinal stretching and 135% by transverse stretching at 175° C., thus obtaining a film having a thickness of 120 μm. This film had $\Delta$nd of 50 nm and Rth of 250 nm and exhibited optical characteristics satisfying nx>ny>nx.

FIG. 2 shows values of $\Delta nd_x/\Delta nd_{550}$ and $Rth_x/Rth_{550}$ of this film in the wavelength range from 400 to 800 nm.

As shown in FIGS. 1 and 2, the values of $\Delta nd_x/\Delta nd_{550}$ and $Rth_x/Rth_{550}$ of the composite birefringent member obtained in Example 1 in the wavelength range of 400 to 800 nm were different from each other. On the other hand, the values of $\Delta nd_x/\Delta nd_{550}$ and $Rth_x/Rth_{550}$ of each of the films obtained in Comparative Examples 1 to 3 in the wavelength range of 400 to 800 nm were identical.

Table 1 shows optical characteristics of the composite birefringent member obtained in Example 1 and the films obtained in Comparative Examples 1 to 3.

TABLE 1

|  | $\Delta$nd (nm) | Rth (nm) | $\Delta nd_{400}/\Delta nd_{550}$ | $Rth_{400}/Rth_{550}$ |
| --- | --- | --- | --- | --- |
| Ex. 1 | 50 | 250 | 0.85 | 1.20 |
| Comp. Ex. 1 | 120 | 155 | 1.02 | 1.02 |
| Comp. Ex. 2 | 50 | 250 | 1.20 | 1.20 |
| Comp. Ex. 3 | 50 | 250 | 1.02 | 1.02 |

As shown in Table 1, the composite birefringent member obtained in Example 1 satisfied $\Delta nd_{400}/\Delta nd_{550}<1$ and $Rth_{400}/Rth_{550}>1$. On the other hand, the films obtained in Comparative Examples 1 to 3 did not satisfy $\Delta nd_{400}/\Delta nd_{550}<1$ and $Rth_{400}/Rth_{550}>1$.

(Evaluation Test)

A polarizing plate (manufactured by Nitto Denko Corporation, trade name: SEG1425DU) was bonded to the front side of a VA mode liquid crystal panel via an acrylic pressure-sensitive adhesive layer. The liquid crystal panel and the polarizing plate were arranged such that their absorption axes met at an angle of 0°. Furthermore, each of the composite birefringent member obtained in Example 1 and films obtained in Comparative Examples 2 and 3 was bonded to the rear side of the liquid crystal panel via an acrylic pressure-sensitive adhesive layer. The liquid crystal panel and the composite birefringent member were arranged such that their in-plane slow axes met at an angle of 0°. Then, another polarizing plate (manufactured by Nitto Denko Corporation, trade name: SEG1425DU) further was bonded to the composite birefringent member or the film via an acrylic pressure-sensitive adhesive layer, thus completing the liquid crystal panel. The composite birefringent member or the film and the polarizing plate were arranged such that their absorption axes met at an angle of 90°.

Next, for the thus-obtained respective liquid crystal panels, viewing angles at contrast ratios of $(Co) \geq 10$ in a perpendicular direction, in a lateral direction, in a diagonal direction (45° to 225°), and in a diagonal direction (135° to 315°) were measured. The contrast ratios were obtained by displaying a white image and a black image on each of the liquid crystal displays and measuring the values of Y, x, and y in a XYZ display system at viewing angles of 0-70° at the front, upper, lower, right and left sides of the display using Ez contrast 160D (trade name, manufactured by ELDIM SA.). Based on the Y-value ($Y_W$) for the white image and the Y-value ($Y_B$) for the black image, the contrast ratio ($Y_W/Y_B$) for every viewing angle was calculated.

Figure 3:
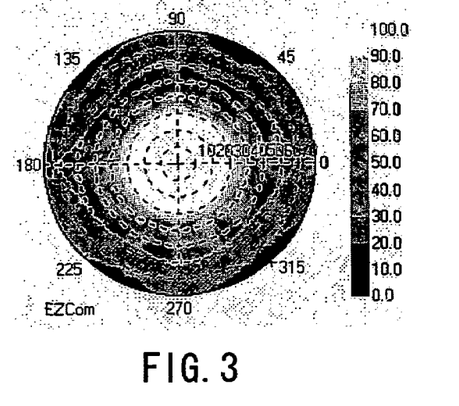
FIG. 3 shows an isocontrast curve of a liquid crystal panel including the composite birefringent member obtained in Example 1.
Figure 4:
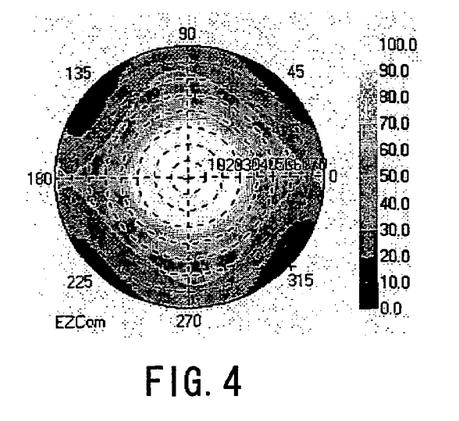
FIG. 4 shows an isocontrast curve of a liquid crystal panel including the film obtained in Comparative Example 2.
Figure 5:
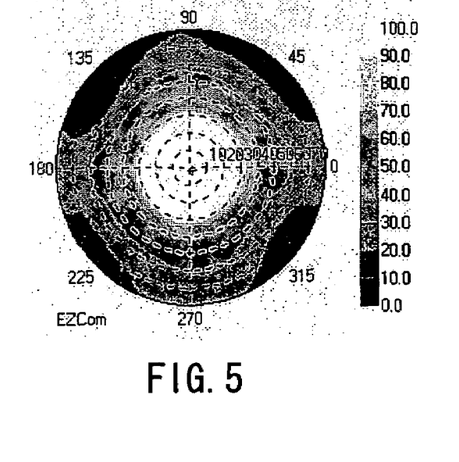
FIG. 5 shows an isocontrast curve of a liquid crystal panel including the film obtained in Comparative Example 3.

FIGS. 3 to 5 are contrast diagrams of the liquid crystal panels including the composite birefringent member obtained in Example 1 and the films obtained in Comparative Examples 2 and 3, respectively. In these diagrams, dark portions indicate contrast ratios of not more than 10.

For each of the liquid crystal panels including the composite birefringent member obtained in Example 1 and the films obtained in Comparative Examples 2 and 3, respectively, the brightness in the front direction, and chromaticity based on a CIE 1931 color system were measured using a spectral light meter CS-1000 (trade name, manufactured by Minolta Co., Ltd.). At this time, the liquid crystal panels were not applied with voltage, and the screen was white as a whole. The measurement points on the liquid crystal panel were separated from a light source by 5 mm, 15 mm, and 25 mm respectively. The results are shown in FIGS. 6 to 8.

It can be seen from FIGS. 3 to 5 that the liquid crystal panel including the composite birefringent member obtained in Example 1 had excellent displaying contrast. This demonstrates that the composite birefringent member obtained in Example 1 compensated the viewing angle of the liquid crystal panel and the birefringence of the liquid crystal cell.

Moreover, the liquid crystal panel including the composite birefringent member obtained in Example 1 exhibited less significant color shift as compared with the liquid crystal panels including the films obtained in Comparative Examples 2 and 3, respectively.

Figure 6:
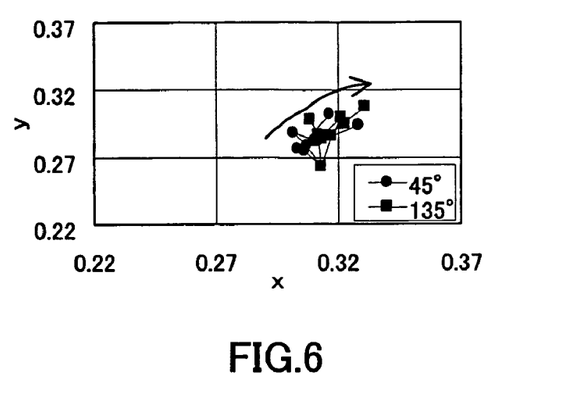
FIG. 6 is a chromaticity diagram based on a CIE 1931 color system of the liquid crystal panel including the composite birefringent member obtained in Example 1.
Figure 7:
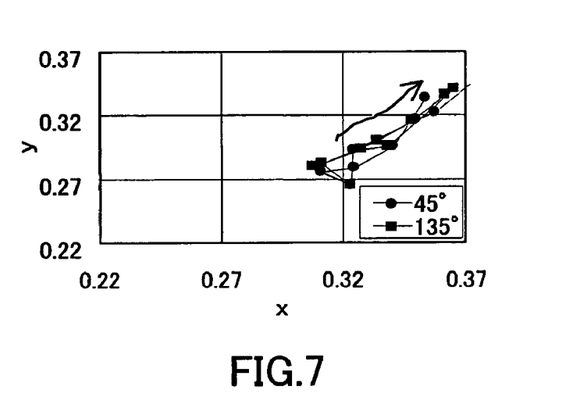
FIG. 7 is a chromaticity diagram based on a CIE 1931 color system of the liquid crystal panel including the film obtained in Comparative Example 2.
Figure 8:
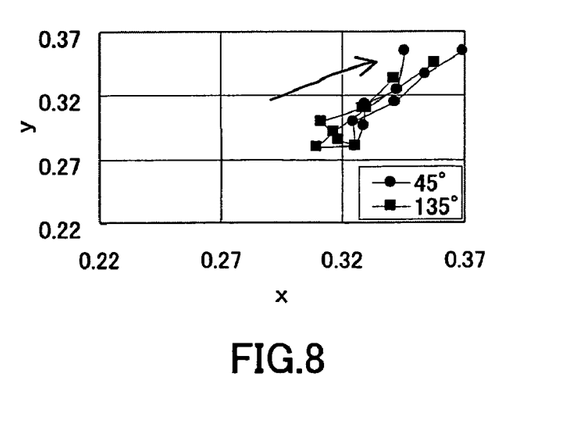
FIG. 8 is a chromaticity diagram based on a CIE 1931 color system of the liquid crystal panel including the film obtained in Comparative Example 3.

Furthermore, it can be seen from FIGS. 6 to 8 that the liquid crystal panel including the composite birefringent member obtained in Example 1 exhibited a smaller amount of white display shift, which demonstrates that display coloring of the liquid crystal panel was suppressed.

The invention claimed is:

1. A composite birefringent member comprising:
a first birefringent layer; and
a second birefringent layer, the second birefringent layer being formed on at least one surface of the first birefringent layer,
wherein a value of $\Delta nd_x/\Delta nd_{550}$ and a value of $Rth_x/Rth_{550}$ of the composite birefringent member as a whole are different from each other in a wavelength range from 400 to 800 nm except 550 nm, and the composite birefringent member satisfies at least one of the following requirements (a) and (b):
(a) the second birefringent layer is formed of at least one non-liquid crystal polymer selected from the group consisting of polyamide, polyimide, polyester, polyetherketone, polyaryletherketone, polyamide imide and polyesterimide; and
(b) $\Delta nd$ and $Rth$ of the composite birefringent member satisfy formulae (I) and (II) below, $$\Delta nd_{400}/\Delta nd_{550} < 1 \quad (I)$$

$$Rth_{400}/Rth_{550} > 1 \quad (II)$$

and $\Delta nd$ of the first birefringent layer > $\Delta nd$ of the second birefringent layer, and $Rth$ of the first birefringent layer < $Rth$ of the second birefringent layer,
In the above,
$\Delta nd_x$ and $Rth_x$ respectively represent $\Delta nd$ and $Rth$ at a wavelength of x nm,
$\Delta nd_{550}$ and $Rth_{550}$ respectively represent $\Delta nd$ and $Rth$ at a wavelength of 550 nm,
$\Delta nd$ is $(nx-ny) \times d$, and
$Rth$ is $(nx-nz) \times d$,
where nx, ny and nz respectively represent refractive indices in an X-axis direction, a Y-axis direction, and a Z-axis direction in the composite birefringent member, the first birefringent layer and the second birefringent layer, with the X-axis direction being an axial direction exhibiting a maximum refractive index within a plane of the composite birefringent member, the Y-axis direction being an axial direction perpendicular to the X axis within the plane, and the Z-axis direction being a thickness direction perpendicular to the X axis and the Y axis, and d represents a thickness of the plane of the composite birefringent member.

2. The composite birefringent member according to claim 1, wherein only the requirement (a) is satisfied.

3. The composite birefringent member according to claim 1, wherein only the requirement (b) is satisfied.

4. The composite birefringent member according to claim 1, wherein both the requirements (a) and (b) are satisfied.

5. The composite birefringent member according to claim 1, wherein the second birefringent layer is formed of a material that is different from a material for forming the first birefringent layer.

6. A laminated polarizing plate comprising a composite birefringent member, wherein the composite birefringent member is the composite birefringent member according to claim 1.

7. A liquid crystal display comprising a liquid crystal cell and an optical member, the optical member being disposed on at least one surface of the liquid crystal cell,
wherein the optical member is the composite birefringent member according to claim 1.

8. An image display selected from the group consisting of a liquid crystal display, a plasma display and an electroluminescence display, the image display comprising the composite birefringent member according to claim 1.

9. The composite birefringent member according to claim 1, wherein the first birefringent layer is formed of at least one material selected from the group consisting of polyethylene, polypropylene, polynorbornene, cellulose-based polymers, polymer carbonate resins, and mixtures of these materials.

10. A liquid crystal display comprising a liquid crystal cell and an optical member, the optical member being disposed on at least one surface of the liquid crystal cell,
wherein the optical member is the laminated polarizing plate according to claim 6.

11. An image display selected from the group consisting of a liquid crystal display, a plasma display and an electroluminescence display, the image display comprising the laminated polarizing plate according to claim 6.

12. An image display comprising the composite birefringent member according to claim 1.

13. An image display comprising the laminated polarizing plate according to claim 6.

14. The composite birefringent member according to claim 1, wherein $\Delta nd$ and $Rth$ of the second birefringent layer exhibit wavelength dispersions that are smaller than those of the $\Delta nd$ and $Rth$ of the first birefringent layer.

15. The composite birefringent member according to claim 1, wherein the second birefringent layer and the first birefringent layer are arranged so that their slow axes are orthogonal to each other.

* * * * *